United States Patent
Shi et al.

(10) Patent No.: US 7,727,508 B2
(45) Date of Patent: Jun. 1, 2010

(54) PROCESS FOR PREPARING POWDER OF NIOBIUM SUBOXIDES OR NIOBIUM

(75) Inventors: Wenfeng Shi, Shizuishan (CN); Xudong Xi, Shizuishan (CN); Yong Li, Shizuishan (CN); Xueqing Chen, Shizuishan (CN); Wei Wang, Shizuishan (CN)

(73) Assignee: Ningxia Orient Tantalum Industry Co., Ltd., Shizuishan, Ningxia (CN)

( * ) Notice: Subject to any disclaimer, the term of this patent is extended or adjusted under 35 U.S.C. 154(b) by 0 days.

(21) Appl. No.: 12/196,492

(22) Filed: Aug. 22, 2008

(65) Prior Publication Data

US 2009/0053132 A1 Feb. 26, 2009

(30) Foreign Application Priority Data

Aug. 25, 2007 (CN) .................. 2007 1 0145183

(51) Int. Cl.
*C01G 33/00* (2006.01)
(52) U.S. Cl. ..................... 423/594.17; 75/585
(58) Field of Classification Search ............ 423/594.17; 75/585
See application file for complete search history.

(56) References Cited

U.S. PATENT DOCUMENTS

| 6,786,951 | B2 | 9/2004 | He et al. | |
|---|---|---|---|---|
| 2005/0013765 | A1* | 1/2005 | Thomas et al. | 423/592.1 |
| 2005/0025699 | A1* | 2/2005 | Reed et al. | 423/594.17 |
| 2008/0291605 | A1* | 11/2008 | Thomas et al. | 361/528 |

FOREIGN PATENT DOCUMENTS

| CN | 1410209 A | 4/2003 |
|---|---|---|
| CN | 1587066 A | 3/2005 |
| CN | 1856446 A | 11/2006 |
| CN | 101139110 A | 3/2008 |
| WO | 00/15555 A1 | 3/2000 |
| WO | 02/093596 A1 | 11/2002 |
| WO | 2004/103906 | 12/2004 |

OTHER PUBLICATIONS

Li Jian, et al; "Preparation of new electrolytic capacitor anode of niobium suboxide" The Chinese Journal of Nonferrous Metals, vol. 15, No. 6, Jun. 2005.
International Search Report: PCT/CN2008/001522.

* cited by examiner

*Primary Examiner*—Stuart Hendrickson
*Assistant Examiner*—Michelle Hou
(74) *Attorney, Agent, or Firm*—Ladas & Parry LLP

(57) ABSTRACT

The present invention relates to a process for preparing powders of niobium suboxides or niobium, wherein the process comprising: mixing the niobium oxides as raw material with reducing agent, conducting a reaction at a temperature in the range of 600~1300° C. in an atmosphere of vacuum or inert gas or hydrogen gas, leaching the reaction product to remove the residual reducing agent and the oxides of the reducing agent and other impurities, heat treating at a temperature of the range of 1000~1600° C. in an atmosphere of vacuum or inert gas, and screening to obtain the powders of niobium suboxide or niobium of capacitor grade. According to the present invention, the niobium oxides were directly reduced into capacitor grade niobium suboxides or niobium with reducing agents which can be easily removed by mineral acids, wherein the speed of the reaction can be controlled and the reaction can directly reduce the niobium oxides into capacitor grade niobium suboxides or niobium powder. According to the present invention, the process is simple with high yield and high productivity. The products obtained have good flowability, low impurities, uniform distribution of oxygen, and have good electrical properties.

15 Claims, 2 Drawing Sheets

PROCESS FOR PREPARING POWDER OF NIOBIUM SUBOXIDES OR NIOBIUM

FIELD OF THE INVENTION

The present invention relates to a process for preparing the powder of niobium suboxides or niobium

BACKGROUND OF THE INVENTION

Niobium suboxide is a kind of ceramic material. Due to its metal conductivity, the $Nb_2O_5$ dielectric oxide film can be formed on the surface thereof, so electrolytic capacitor can be manufactured thereof.

The agglomerated niobium suboxides powders for manufacturing electrolytic capacitor shall have low content of impurities, large specific surface area, large pore size and good flowability.

There are some available techniques which can be utilized for preparing the powder of niobium suboxides and niobium as mentioned above. But some disadvantages are presented in different aspects.

Chinese patent application CN 1587066A discloses a process for preparing niobium suboxide powders by heat treating the mixture of niobium oxide and capacitor grade niobium powder, in which process the niobium suboxides were prepared through the oxidization of capacitor grade niobium powder by niobium oxide. The problem of this process is that capacitor grade niobium powders have to be prepared in advance. Moreover, after niobium oxide oxidizes capacitor grade niobium powder, some oxygen is lost, the residue is not suitable for manufacturing capacitor. As a result, the period of the process is long. In addition, since the requirements on the capacitor grade niobium powder as starting material are rigorous, this process is not suitable for the industrial scale production.

WO 00/15555 discloses a process, which includes reducing the niobium pentoxide in the presence of hydrogen gas by using the flake, particulates or powder of tantalum or niobium for sufficient time and at a sufficient temperature, which permits the transfer of oxygen atoms from the pentoxides to the reducing agent to reduce niobium pentoxide. This process has some problems as follows: tantalum or niobium in the shape of flake or particulate is used for reducing agent, thus the surface area is low and the contacting area with the oxides is low. As a result, the reaction dos not proceed uniformly, which leads to the distribution of oxygen in the product not uniform, degrading the properties of the product. Since the reducing agent of tantalum or niobium is not soluble in acid, the residue of tantalum or niobium can not be removed.

SUMMARY OF TEE INVENTION

In order to overcome the disadvantages of the prior art, it is an object of the present invention to provide a simple process for preparing powder of niobium suboxides or niobium, which is characterized by having stable properties of the products and having high yield.

The technical solutions of the present invention are:

A process for preparing powders of niobium suboxides or niobium, wherein the process comprising: mixing the niobium oxides as raw material with reducing agent, conducting a reaction at a temperature in the range of 600~1300° C. in an atmosphere of vacuum or inert gas or hydrogen gas, leaching the reaction product to remove the residual reducing agent and the oxides of the reducing agent and other impurities, heat treating the product at a temperature in the range of 1000~1600° C. in an atmosphere of vacuum or inert gas, and screening to obtain the powders of niobium suboxide or niobium of capacitor grade.

In a preferred embodiment of the present invention, said niobium oxides as raw material are niobium pentoxide or oxygen-partially-reduced niobium oxides.

In a preferred embodiment of the present invention, said niobium oxides as raw material pass the screen of a 20 mesh, preferably of 60 mesh.

In a preferred embodiment of the present invention, said niobium oxides as raw material has a bulk density of 0.2~1.1 $g/cm^3$.

In a preferred embodiment of the present invention, the amount of said reducing agent is 0.5~6 times of the niobium oxide as raw material, by weight.

In a preferred embodiment of the present invention, said reducing agent is at least one selected from the group consisting of calcium, strontium, barium, yttrium, lanthanum, cerium, praseodymium, neodymium, samarium, europium, gadolinium, terbium, dysprosium, holmium, erbium, thulium, ytterbium and lutetium, or their hydrides or their alloys or mixture of them.

In a preferred embodiment of the present invention, the shape of said reducing agent is bulk, flake, particulate or powder or any combination thereof.

In a preferred embodiment of the present invention, said reducing agent is dissolvable in nitric acid or hydrochloric acid.

In a preferred embodiment of the present invention, the oxides of said reducing agent at each valence state can be dissolved in nitric acid or hydrochloric acid.

In a preferred embodiment of the present invention, said reducing agent is in solid state during the reduction.

In a preferred embodiment of the present invention, the products of said reaction are of solid state in the reduction.

In a preferred embodiment of the present invention, the time of said heat treatment is 1~600 minutes.

In a preferred embodiment of the present invention, the oxygen content of said niobium suboxides powder is in the range of 13.0~17.0 wt %, preferably 13.8~15.9 wt %.

In a preferred embodiment of the present invention, the oxygen content of said niobium powder is in the range of 0~4.0 wt %.

In a preferred embodiment of the present invention, the diameter of the powder of said niobium suboxides or niobium is less than 350 μm (−40 mesh).

In a preferred embodiment of the present invention, the specific capacitance of the powder of said niobium suboxides or niobium is 40,000~250,000 μFV/g.

According to the present invention, the niobium oxides as raw material were directly reduced into capacitor grade niobium suboxides or niobium with reducing agents which can be easily removed by mineral acids. The present invention is characterized in that, the reducing agents that are used can be removed by mineral acid, the speed of the reaction can be controlled and the niobium oxides as raw material could be reduced directly into capacitor grade niobium suboxides or niobium powder. According to the present invention, the process is simple, with high yield and high productivity. The product obtained has good flowability, low impurities content, uniform distribution of oxygen, and has good electrical properties. The appearance the powder of the present invention is porous sponge like, or porous coral like or flake like

DETAILED DESCRIPTION OF THE PRESENT INVENTION

The data disclosed in the present specification were measured as follows:
- the bulk density of the powder (SBD) was measured in accordance with the process of the Chinese national standard GB 5060-85;
- the average particle diameter of the powder (FSSS) was measured in accordance with the process of the Chinese national standard GB 3249-82;
- the specific surface area of the powder (BET) was tested in accordance with the BET method with the specific surface area analyzer ASAP2010 made by Micromerities Corporation, US;
- the flowability of the powder was tested in accordance with the method of ASTM-B-213-90;
- the SEM photographs were taken with JSM-5610LV scan electronic microscope.

The niobium suboxides or niobium powder according to the present invention are suitable for manufacturing capacitors, and the electrical properties thereof are tested on the capacitor anode blocks made as follows.

A pellet was pressed into a diameter of 5.0 mm and the density of 3.0 g/cm$^3$ using 150 mg of the powder, and the pellet was sintered for 10 minutes in a vacuum furnace. The sintered pellet was anodized in 0.1 vol % $H_3PO_4$ solution at 60° C. under 30 V voltage to form anode block.

Example 1

An amount of 1 kilogram of −60 mesh (passing 60 mesh screen and with a particle size of less than 250 μm) niobium pentoxide powder was mixed with 1.01 kilogram of −60 mesh yttrium powder uniformly. The mixture powder was charged in a reaction retort and hydrogen gas was filled in to reach positive pressure (the pressure higher than 0.02 MPa). The mixture was heated to 900° C. and soaked for 360 minutes, and were taken out after being cooled to room temperature. The pressure was controlled to not greater than 0.15 MPa during reaction.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.80 kg.

The recovered powder was charged into a vacuum furnace, after the furnace was vacuumed to pressure required by the furnace (lower than 0.1 Pa), the charged powder was heated to 1250° C. and soaked for 30 minutes, cooled to room temperature. After argon gas was filled, the powder was discharged. The powder was screened with a 60 mesh screen, the product of −60 mesh powder is 0.79 kg.

Figure 1:
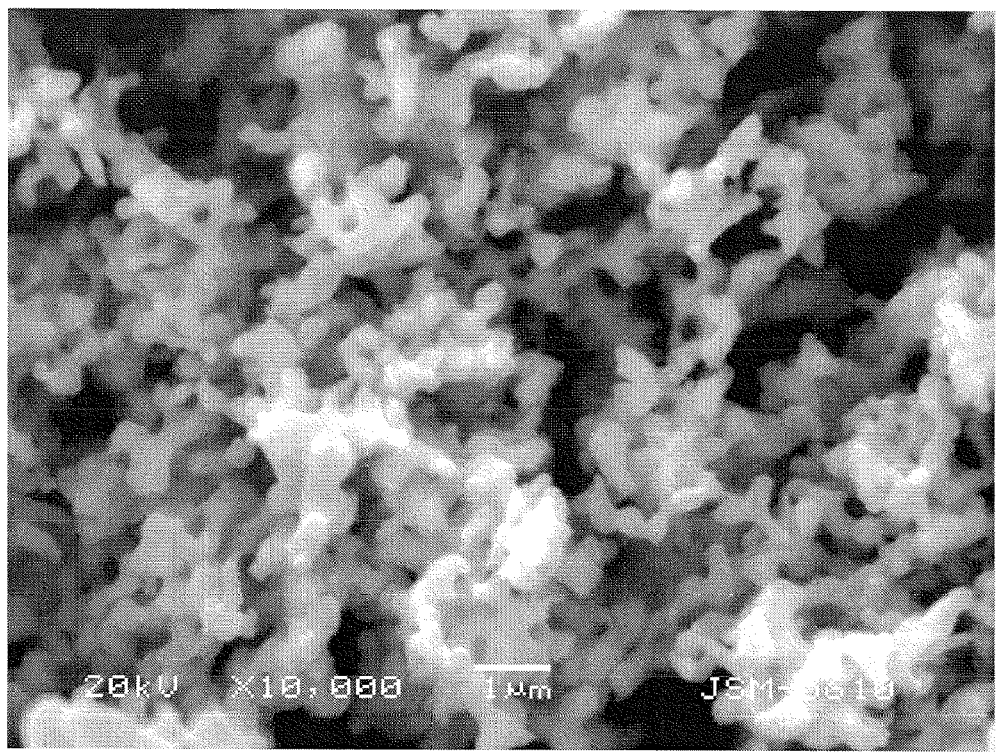
FIG. 1 is a SEM photograph at 10000 magnifications of the product according to the example 1 of the present invention.

The SEM photograph in 10000 magnifications of the product was shown in FIG. 1. The oxygen content of the product was listed in table 1, the physical properties were summarized in table 2, and the electrical properties were summarized in table 3.

Example 2

An amount of 1 kilogram of −60 mesh (less than 250 μm) niobium pentoxide powder was mixed with 1.4 kilogram of −20 mesh neodymium hydride powder uniformly. The mixture powder was charged in a reaction retort and argon gas was filled in to reach positive pressure (the pressure higher than 0.02 MPa). The mixture was heated to 920° C. and soaked for 480 minutes, and were taken out after being cooled to room temperature. The pressure was controlled to not greater than 0.15 MPa during reaction.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.76 kg.

The recovered powder was charged into a vacuum furnace, after the furnace was vacuumed to pressure required by the furnace (lower than 0.1 Pa), the charged powder was heated to 1240° C. and soaked for 30 minutes, cooled to room temperature. After argon gas was filled, the powder was discharged. The powder was screened with a 60 mesh screen, the product of −60 mesh powder is 0.76 kg.

Figure 2:
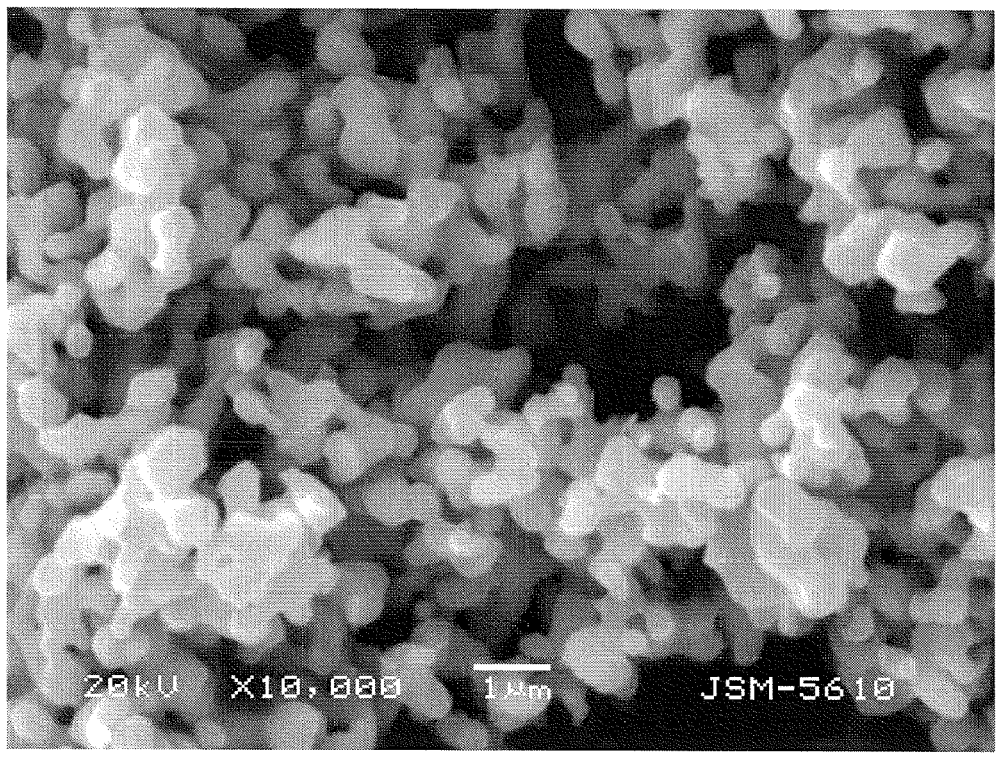
FIG. 2 is a SEM photograph at 10000 magnifications of the product according to the example 2 of the present invention.

The SEM photograph in 10000 magnifications of the product was shown in FIG. 2. The oxygen content of the product was listed in table 1, the physical properties were summarized in table 2, and the electrical properties were summarized in table 3.

Example 3

An amount of 1 kilogram of −60 mesh niobium oxides which has an oxygen content of 24.7 wt % was mixed with 0.9 kilogram of −20 mesh (less than 850 μm) neodymium powder uniformly. The mixture powder was charged in a reaction retort and hydrogen gas was filled in to reach positive pressure (the pressure higher than 0.02 MPa). The mixture was heated to 920° C. and soaked for 480 minutes, and were taken out after being cooled to room temperature. The pressure was controlled to not greater than 0.15 MPa during reaction.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.84 kg.

The recovered powder was charged into a vacuum furnace, after the furnace was vacuumed to pressure required by the furnace (lower than 0.1 Pa), the charged powder was heated to 1200° C. and soaked for 120 minutes, cooled to room temperature. After argon gas was filled, the powder was discharged. The powder was screened with a 60 mesh screen, the product of −60 mesh powder is 0.83 kg.

Figure 3:
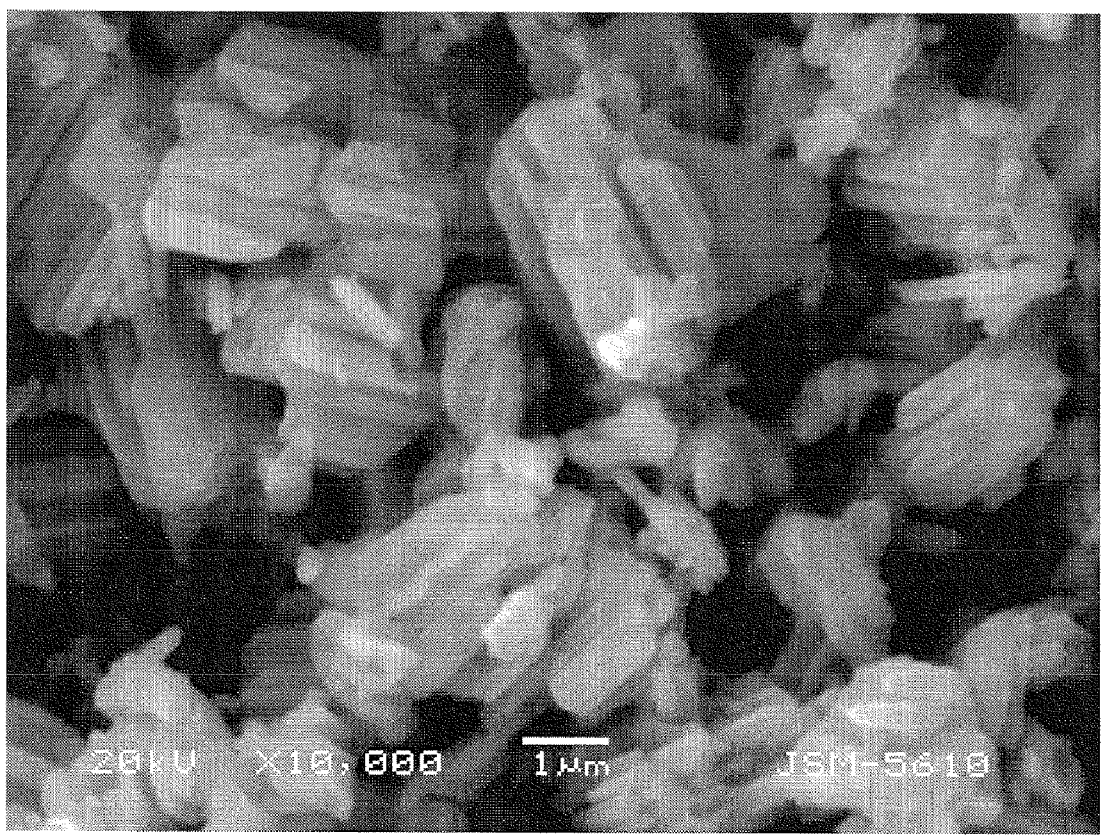
FIG. 3 is a SEM photograph at 10000 magnifications of the product according to the example 3 of the present invention.

The SEM photograph in 5000 magnifications of the product was shown in FIG. 3. The oxygen content of the product was listed in table 1, the physical properties were summarized in table 2, and the electrical properties were summarized in table 3.

Example 4

An amount of 1 kilogram of −60 mesh niobium oxides which has an oxygen content of 24.45 wt % was mixed with 0.65 kilogram of −60 mesh yttrium powder uniformly. The mixture powder was charged in a reaction retort and hydrogen gas was filled in to reach positive pressure (the pressure higher than 0.02 MPa). The mixture was heated to 860° C. and soaked for 600 minutes, and were taken out after being cooled to room temperature. The pressure was controlled to not greater than 0.15 MPa during reaction.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.86 kg.

The recovered powder was charged into a vacuum furnace, after the furnace was vacuumed to pressure required by the furnace (lower than 0.1 Pa), the charged powder was heated to 1200° C. and soaked for 60 minutes, cooled to room temperature. After argon gas was filled, the powder was discharged. The powder was screened with a 60 mesh screen, the product of −60 mesh powder is 0.84 kg.

The oxygen content of the product was listed in table 1, the physical properties were summarized in table 2, and the electrical properties were summarized in table 3.

Example 5

An amount of 1 kilogram of −60 mesh niobium pentoxide powder was mixed with 1.05 kilogram of −60 mesh yttrium hydride powder uniformly. The mixture powder was charged in a vacuum furnace and argon gas was filled in to reach positive pressure (the pressure higher than 0.02 MPa). The mixture was heated to 880° C. and soaked for 600 minutes, and were taken out after being cooled to room temperature. The pressure was controlled to not greater than 0.15 MPa during reaction.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.78 kg.

The recovered powder was charged into a vacuum furnace, after the furnace was vacuumed to pressure required by the furnace (lower than 0.1 Pa), the charged powder was heated to 1200° C. and soaked for 90 minutes, cooled to room temperature. After argon gas was filled, the powder was discharged. The powder was screened with a 60 mesh screen, the product of −60 mesh powder is 0.75 kg.

The oxygen content of the product was listed in table 1, the physical properties were summarized in table 2, and the electrical properties were summarized in table 3.

Example 6

An amount of 1 kilogram of −60 mesh niobium pentoxide powder was mixed with 0.36 kilogram of −60 mesh calcium powder. The mixture powder was charged in a vacuum furnace. The vacuum was controlled at lower than 0.08 MPa. The mixture was heated to 700° C. and soaked for 900 minutes, and were taken out after being cooled to room temperature.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.81 kg.

The recovered powder was charged into a vacuum furnace, after the furnace was vacuumed to pressure required by the furnace (lower than 0.1 Pa), the charged powder was heated to 1100° C. and soaked for 270 minutes. After powder was cooled to room temperature, the powder was discharged. The powder was screened with a 60 mesh screen, the product of −60 mesh powder is 0.80 kg.

The oxygen content of the product was listed in table 1, the physical properties were summarized in table 2, and the electrical properties were summarized in table 3.

Example 7

An amount of 1 kilogram of −60 mesh niobium pentoxide powder was mixed with 1.47 kilogram of −60 mesh lanthanum-samarium alloy (lanthanum-samarium weight ratio as 6:4) powder uniformly. The mixture powder was charged in a reaction retort. Argon gas was firstly filled in to the pressure of 0.02 Mpa, and hydrogen gas was filled in to 0.06 MPa. The pressure was controlled at not greater than 0.15 MPa during reaction. The mixture was heated to 1000° C. and soaked for 300 minutes, and were taken out after being cooled to room temperature.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.77 kg.

The recovered powder was charged into a vacuum furnace, after the furnace was vacuumed to pressure required by the furnace (lower than 0.1 Pa), the charged powder was heated to 1450° C. and soaked for 30 minutes, cooled to room temperature. After powder was cooled to room temperature and argon was filled in, the powder was discharged. The powder was screened with a 60 mesh screen, the product of −60 mesh powder is 0.73 kg.

The oxygen content of the product was listed in table 1, the physical properties were summarized in table 2, and the electrical properties were summarized in table 3.

Example 8

An amount of 1 kilogram of −60 mesh niobium pentoxide powder was mixed with 1.7 kilogram of −20 mesh erbium powder uniformly. The mixture powder was charged in a reaction retort and argon gas was filled in to reach positive pressure (the pressure higher than 0.02 MPa). The pressure was controlled to not greater than 0.15 MPa during reaction. The mixture was heated to 1000° C. and soaked for 120 minutes, and were taken out after being cooled to room temperature.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.77 kg.

The recovered powder was charged into a vacuum furnace, after the furnace was vacuumed to pressure required by the furnace (lower than 0.1 Pa), the charged powder was heated to 1340° C. and soaked for 30 minutes, cooled to room temperature. After argon gas was filled, the powder was discharged. The powder was screened with a 60 mesh screen, the product of −60 mesh powder is 0.76 kg.

The oxygen content of the product was listed in table 1, the physical properties were summarized in table 2, and the electrical properties were summarized in table 3.

Example 9

An amount of 1 kilogram of −60 mesh niobium pentoxide powder was mixed with 2.0 kilogram of −60 mesh yttrium powder uniformly. The mixture powder was charged in a vacuum furnace and hydrogen gas was filled in to reach positive pressure (the pressure higher than 0.02 MPa). The mixture was heated to 920° C. and soaked for 720 minutes, and were taken out after being cooled to room temperature.

The treated powder was screened with a 60 mesh screen, the −60 mesh powder was leached with a solution of 10% hydrochloric acid in an weight proportion of powder:solution of 1:4, subsequently washed with de-ionized water, and then dried. The recovered powder is 0.65 kg.

The recovered powder was charged into a vacuum furnace, after the furnace was vacuumed to pressure required by the furnace (lower than 0.1 Pa), the charged powder was heated to 1050° C. and soaked for 60 minutes, cooled to room temperature. After argon gas was filled, the powder was discharged. The powder was screened with a 60 mesh screen, the product of −60 mesh powder is 0.63 kg.

The oxygen content of the product was listed in table 1, the physical properties were summarized in table 2, and the electrical properties were summarized in table 3.

In the above 9 examples, capacitor grade niobium suboxides powders were prepared in Examples 1-8, and capacitor grade niobium powder was prepared in Example 9.

Comparative Example 1

According to the process of CN 1587066A, an amount of 90 g capacitor grade niobium powder made according to CN1410209A was mixed with 200 g of −60~+400 mesh (passing 60 mesh screen and not passing 400 mesh screen and with a particle size of 38~250 μm) $Nb_2O_5$ powder uniformly. The mixture powder was granulated with de-ionized water and subsequently dried. The granulated particles were charged in a vacuum furnace. The furnace was vacuumed to the pressure required by the furnace, and then filled with argon gas. The charged material was heated to 900° C. and soaked for 120 minutes, cooled to room temperature, and then taken out.

The heat treated powder was screened with a 60 mesh screen, the −60 mesh powder was mixed with 90 g capacitor grade niobium powder. The mixture powder was charged in a vacuum furnace. The furnace was vacuumed to the pressure required by the furnace. The charged material was heated to 1300° C. and soaked for 60 minutes, cooled to room temperature, filled with argon gas, and then taken out. The product was screened with a 60 mesh screen. The −60 mesh niobium suboxides powders is 380 g. The oxygen content of the product was listed in table 1, the physical properties were summarized in table 2, and the electrical properties were summarized in table 3.

Comparative Example 2

According to the process of WO 00/15555, an amount of 200 g capacitor grade niobium powder was mixed with 200 g of −60 mesh (less than 250 μm) $Nb_2O_5$ powder uniformly. The mixture powder was heated to 1250° C. and soaked for 30 minutes in an atmosphere of hydrogen gas. The subsequent treat process is carried out as described in that application. The oxygen content of the niobium suboxides was listed in table 1, the physical properties were summarized in table 2, and the electrical properties were summarized in table 3.

TABLE 1

Oxygen contents of the niobium suboxides or niobium powders.

| Example | Oxygen contents (ppm) |
|---|---|
| Example 1 | 145000 |
| Example 2 | 151000 |
| Example 3 | 148000 |
| Example 4 | 147000 |
| Example 5 | 145000 |
| Example 6 | 159000 |
| Example 7 | 138000 |
| Example 8 | 130000 |
| Example 9 | 11000 |
| Comparative Example 1 | 147000 |
| Comparative Example 2 | 146000 |

TABLE 2

Physical properties of the niobium suboxides or niobium powders.

| Examples | FSSS μm | SBD g/cm³ | Flow-abilities Sec/50 g | Distribution of the particles (%) 75~250 μm | 250~38 μm | <38 μm |
|---|---|---|---|---|---|---|
| Example 1 | 2.00 | 0.75 | 24 | 87.24 | 10.50 | 2.26 |
| Example 2 | 1.50 | 0.87 | 23 | 90.30 | 8.23 | 1.47 |
| Example 3 | 1.70 | 0.82 | 20 | 85.26 | 11.33 | 3.41 |
| Example 4 | 3.00 | 0.84 | 26 | 89.32 | 10.24 | 0.44 |
| Example 5 | 2.50 | 0.97 | 20 | 94.65 | 4.68 | 0.67 |
| Example 6 | 1.35 | 0.79 | 27 | 85.64 | 9.35 | 5.01 |
| Example 7 | 3.20 | 1.06 | 22 | 88.65 | 10.78 | 0.57 |
| Example 8 | 4.20 | 1.12 | 20 | 94.27 | 4.58 | 1.15 |
| Example 9 | 3.36 | 0.91 | 21 | 83.22 | 15.84 | 0.94 |
| Comparative Example 1 | 4.50 | 1.21 | 25 | 61.9 | 34.8 | 3.3 |
| Comparative Example 2 | 3.30 | 1.02 | N/A | 50.2 | 38.9 | 10.9 |

TABLE 3

Electrical properties of the niobium suboxides or niobium powders.

| Example | Leakage nA/CV | Capacitance μFV/g | Sintered temperature ° C. |
|---|---|---|---|
| Example 1 | 0.15 | 153900 | 1350 |
| Example 2 | 0.18 | 115642 | 1450 |
| Example 3 | 0.13 | 126865 | 1400 |
| Example 4 | 0.11 | 185877 | 1300 |
| Example 5 | 0.17 | 95231 | 1600 |
| Example 6 | 0.13 | 93354 | 1450 |
| Example 7 | 0.24 | 115389 | 1350 |
| Example 8 | 0.30 | 114589 | 1350 |
| Example 9 | 0.22 | 133564 | 1100 |
| Comparative Example 1 | 0.42 | 86532 | 1430 |
| Comparative Example 2 | 2.20 | 88700 | 1430 |

What we claim are:

1. A process for preparing powders of niobium suboxides or niobium, wherein the process comprising:
   mixing the niobium oxides as raw material with reducing agent,
   conducting a reaction at a temperature in the range of 600~1300° C. in an atmosphere of vacuum or inert gas or hydrogen gas, leaching the reaction product to remove the residual reducing agent and the oxides of the reducing agent and other impurities, heat treating at a temperature in the range of 1000~1600° C. in an atmosphere of vacuum or inert gas, and screening to obtain the powders of niobium suboxides or niobium of capacitor grade, wherein said reducing agent is at least one selected from the group consisting of yttrium, lanthanum, cerium, praseodymium, neodymium, samarium, europium, gadolinium, terbium, dysprosium, holmium, erbium, thulium, ytterbium and lutetium, or their hydrides or their alloys or mixture of them.

2. The process according to claim 1, wherein said niobium oxides as raw material are niobium pentoxide or oxygen-partially-reduced niobium oxides.

3. The process according to claim 1 or 2, wherein said niobium oxides as raw material pass the screen of a 20 mesh, preferably of 60 mesh.

4. The process according to claim 1 or 2, wherein said niobium oxides as raw material has a bulk density of 0.2~1.1 g/cm$^3$.

5. The process according to claim 1, wherein the amount of said reducing agent is 0.5~6 times of the niobium oxides as raw material, by weight.

6. The process according to claim 1 or 5, wherein the shape of said reducing agent is bulk, flake, particulate or powder or any combination thereof.

7. The process according to claim 1 or 5, wherein said reducing agent is dissolvable in nitric acid or hydrochloric acid.

8. The process according to claim 1, wherein the oxides of said reducing agent at each valence state are dissolvable in nitric acid or hydrochloric acid.

9. The process according to claim 1 or 5, wherein said reducing agent is in solid state during the reduction.

10. The process according to claim 1, wherein the products of said reaction are in solid state in the reduction.

11. The process according to claim 1, wherein the time of said heat treatment is 1~600 minutes.

12. The process according to claim 1, wherein the oxygen content of said niobium suboxides powder of capacitor grade is in the range of 13.0~17.0 wt %, preferably 13.8~15.9 wt %.

13. The process according to claim 1, wherein the oxygen content of said niobium powder of capacitor grade is in the range of 0~4.0 wt %.

14. The process according to claim 1 or claim 12 or claim 13, wherein the diameter of the powder of said niobium suboxides or niobium is less than 350 μm (−40 mesh).

15. The process according to claim 1 or claim 12 or claim 13, wherein the specific capacitance of the powder of said niobium suboxides or niobium is 40,000~250,000 μFV/g.

* * * * *